United States Patent [19]

Suzuki

[11] Patent Number: 5,452,458
[45] Date of Patent: Sep. 19, 1995

[54] METHOD OF CONTROLLING A FLEXIBLE DISK CONTROLLER

[75] Inventor: Kenichi Suzuki, Tokyo, Japan

[73] Assignee: NEC Corporation, Tokyo, Japan

[21] Appl. No.: 69,836

[22] Filed: Jun. 1, 1993

[30] Foreign Application Priority Data

Jun. 1, 1992 [JP] Japan .................................. 4-140372

[51] Int. Cl.⁶ ............................................. G06F 12/02
[52] U.S. Cl. .................................. 395/700; 364/245; 364/251; 364/246.3; 364/236.2; 364/DIG. 1; 369/97
[58] Field of Search ................... 395/650, 700; 369/97

[56] References Cited

U.S. PATENT DOCUMENTS

4,965,801 10/1990 DuLac ................................ 395/275
5,124,987 6/1992 Milligan et al. ................... 371/10.1

Primary Examiner—Kevin A. Kriess
Assistant Examiner—John Q. Chavis
Attorney, Agent, or Firm—Young & Thompson

[57] ABSTRACT

The invention provides a novel method of controlling a flexible disk controller for executing a format operation and a write operation of data into a flexible disk having a plurality of tracks, each of said tracks being divided into a plurality of sectors. The flexible disk controller executes sequential-specifying sectors to be accessed in plural sectors of a specified track under parameters supplied from a host system, and subsequently execute both a write operation of identification informations into an identification field of a specified sector and a concurrent write operation of data into a data field of said specified sector. The above operation are repeated for every sectors of said specified track.

12 Claims, 9 Drawing Sheets

METHOD OF CONTROLLING A FLEXIBLE DISK CONTROLLER

BACKGROUND OF THE INVENTION

1. Field of the Invention

The invention relates to a method of controlling a flexible disk controller, and more particularly to a method of formatting a flexible disk by a flexible disk controller for computers.

2. Description of Related Art

Figure 1:
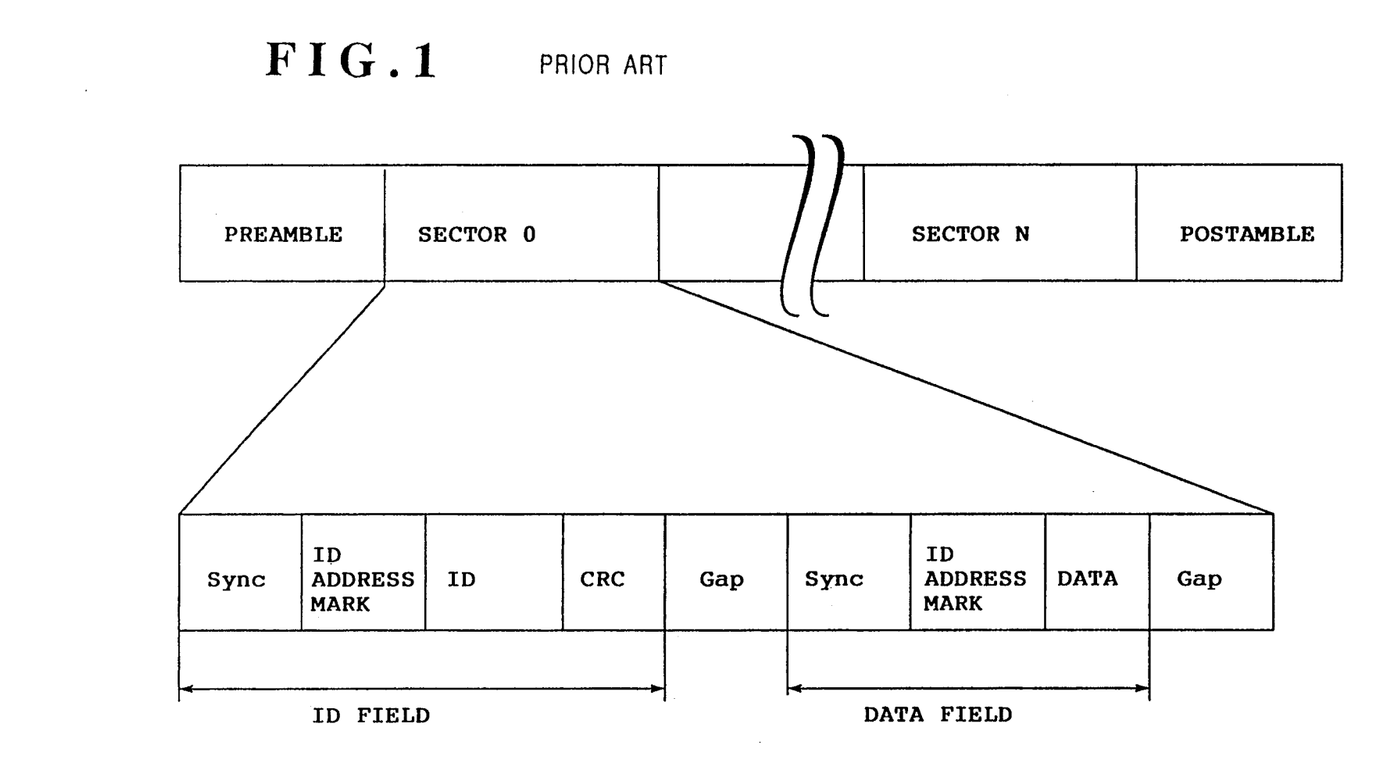
FIG. 1 is a block diagram of the format of a single track in a flexible disk.

The conventional formatting system of a flexible disk will be described with reference to FIG. 1. A flexible disk or a floppy disk comprises a plurality of tracks, each of which further comprises a plurality of sectors and is terminated by both a preamble and a postamble. Each of the sectors is allocated with address and it comprises an identification field (an ID field) and a data field, both of which are separated from each other through a gap at which a gap data is written. Each of the identification field (ID field) further comprises a syno, an identification address mark (an ID address mark), an identification, and a cyclic redundancy check (a CRC). Each of the data field comprises a sync, a data address mark (an ID address mark), a data, and a cyclic redundancy check (a CRC).

Figure 2:
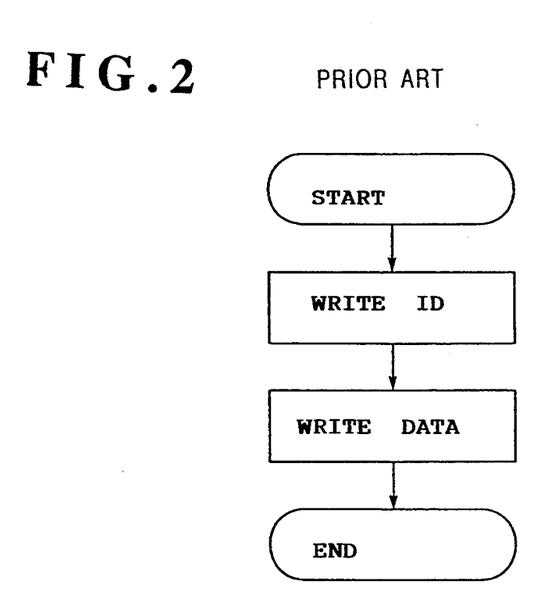
FIG. 2 is a simplified flow chart of the format operation and the data write operation in the prior art.
Figure 3A:
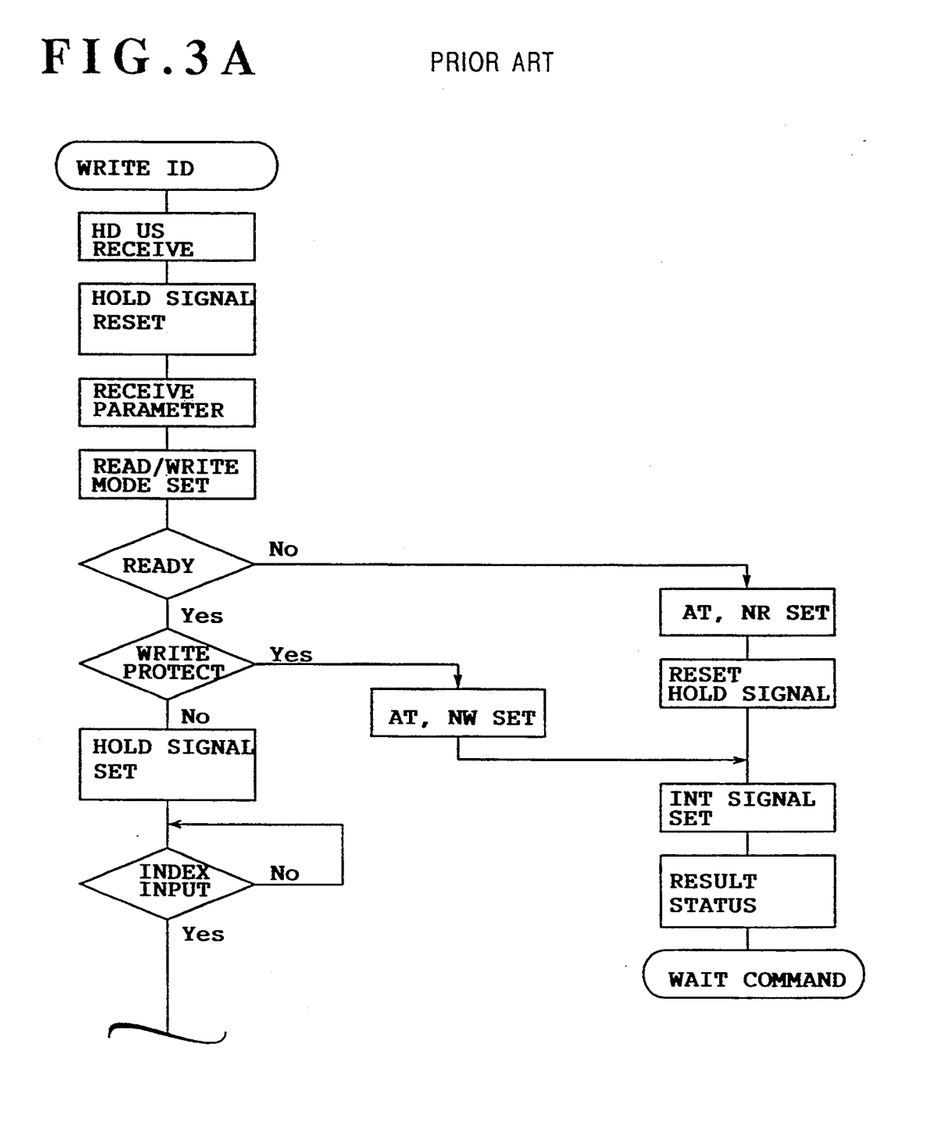
FIGS. 3A and 3B are detailed flow charts of a format operation and a data write operation in the prior art.
Figure 3B:
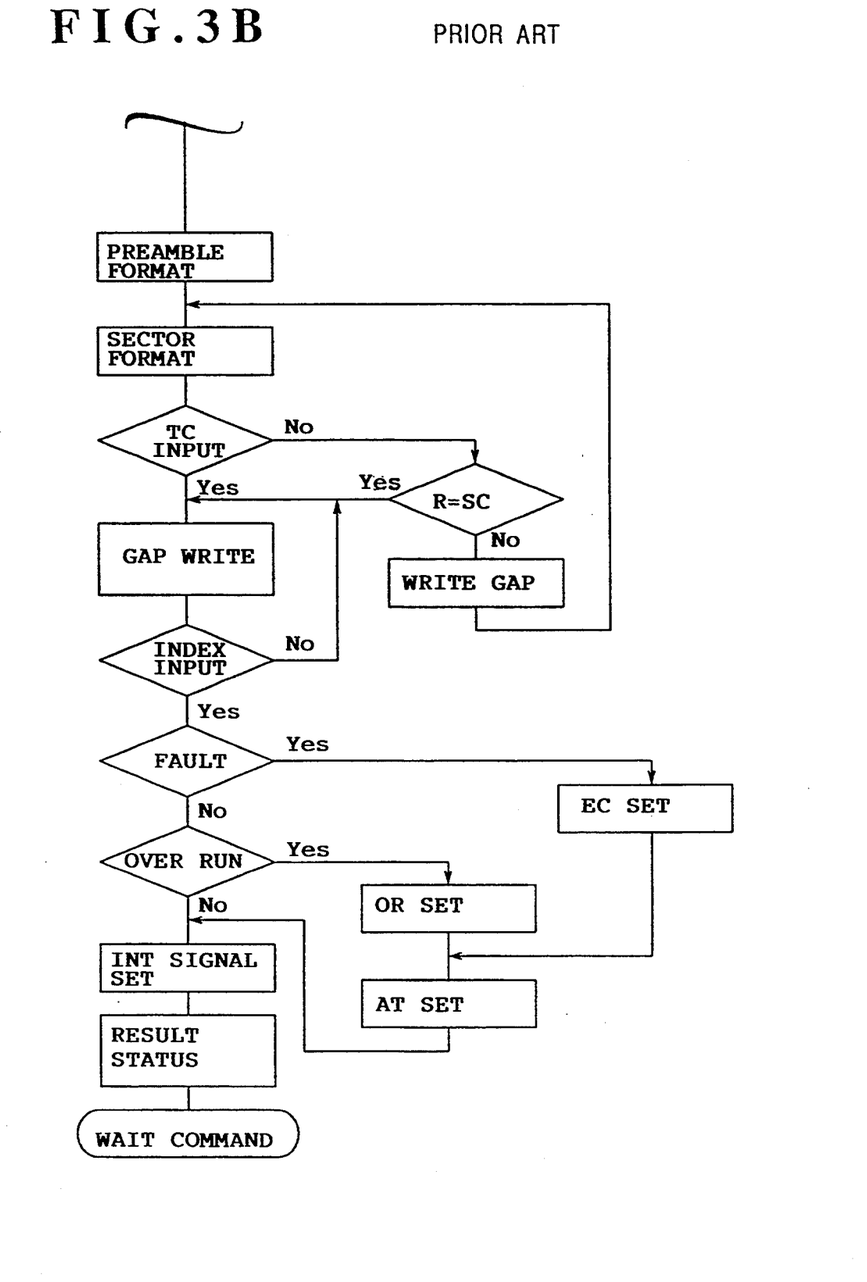
Figure 4A:
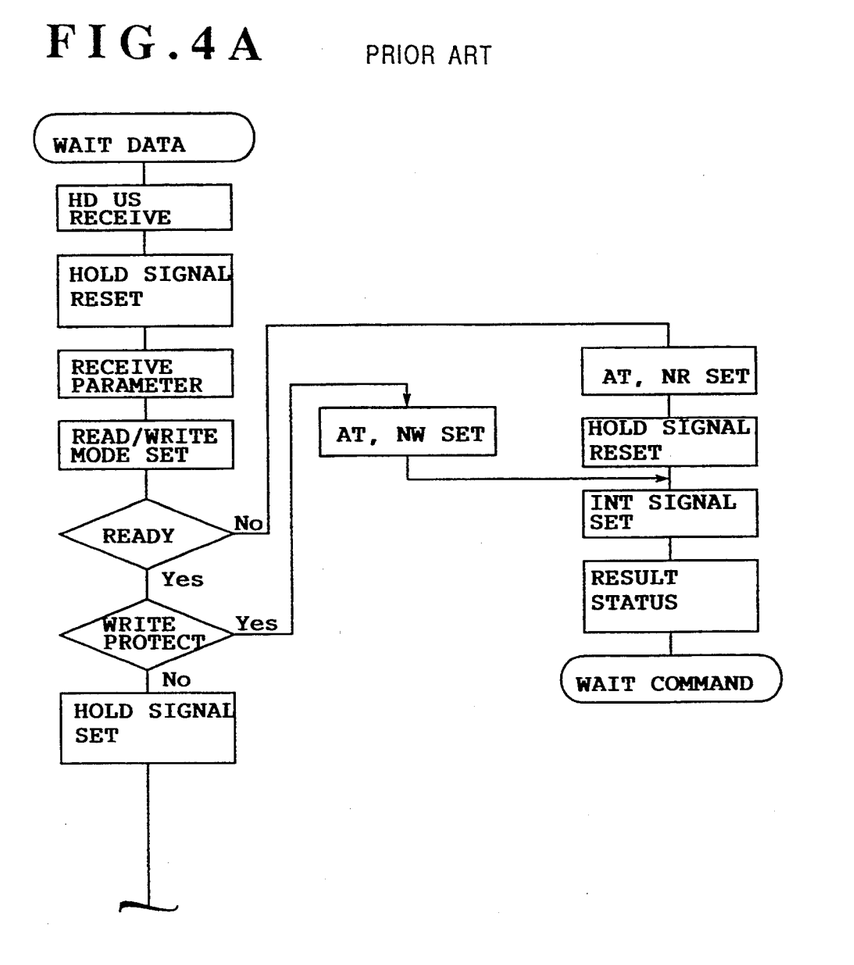
FIGS. 4A and 4B are detailed flow charts of another format operation and a data write operation in the prior art.
Figure 4B:
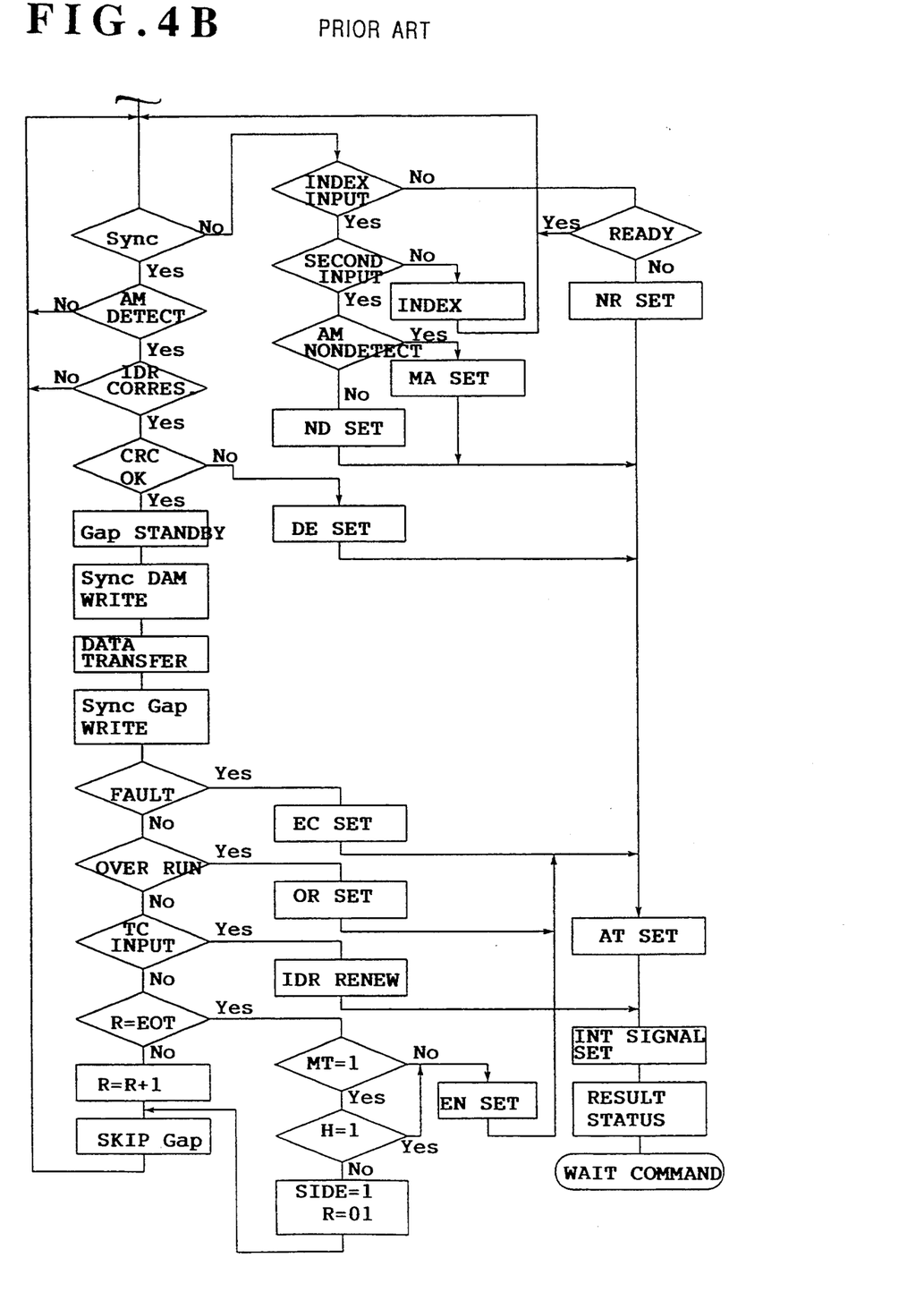

The conventional formatting operation of the flexible disk by the flexible disk controller and a subsequent operation of a data storage into the formatted flexible disk will subsequently be described with reference to FIG. 2. With respect to the flexible disk format, the flexible disk controller executes a write operation of identification information into all tracks of a flexible disk thereby a format of the flexible disk is conducted, after which thereafter the flexible disk controller initiates a write operation entering data into the formatted flexible disk.

The write operation of the identification information for formatting a flexible disk is executed as follows. A flexible disk controller receives, from a host system, an instruction of a write operation of identification information including parameters into a flexible disk and then confirms a status of a flexible disk drive. Thereafter, the flexible disk controller receives index pulse signals from the flexible disk drive and then the flexible disk controller initiates sequential formatting operations of every tracks of the flexible disk. In the format operation of the tracks, after receipt of an index pulse signal, the flexible disk controller initiates a format operation of a track whereby, a preamble format operation is executed previous to all other format operations. After the preamble format operation, the flexible disk controller executes sequential format operations of the plural sectors in the track, terminated by a postamble format operation.

In a format operation of each sector in the track, the flexible disk controller executes a format operation of an identification field (ID field) and a subsequent format operation of a gap data. The flexible disk controller subsequently executes a format operation of the data field, again followed by a gap data format operation.

An identification field format operation of each sector is executed as follows. A flexible disk controller first generates sync data and then initiates a write operation of sync data into an identification field of a sector. After that, the flexible disk controller generates the identification address mark for a subsequent write operation thereof into the identification field of the sector. The flexible disk controller then causes a request for a transfer of an identification information and then transmits the request to a host system. The host system receives the request and then transfers the identification information to the flexible disk controller. The flexible disk controller receives the identification information from the host system and then executes a write operation of the identification information into the identification field. After that, the flexible disk controller generates a cyclic redundancy check information for a subsequent write operation thereof into the identification field. This is how the format operation of the identification field of the sector is completed.

A gap data format operation follows the above identification field format operation. The data field format operation is subsequently executed by a flexible disk controller. As described above, the flexible disk controller has received the parameters accompanying the identification information from the host system. The parameters contain information about data patterns. The flexible disk controller executes a continuous write operation of data pattern into a data field. The format operation of the sector in the track is terminated by a gap data write operation into the sector. This is how the format of the sector in the track is completed.

After the above format operation of one sector, format operations of remaining sectors in the track are sequentially executed in the same manner, until format operations of all sectors in the single track are completed.

After the format operations of all sectors in the track, the flexible disk controller executes a format operation of a postamble as a final format operation of the track, resulting in a completion of the format operation of the track. After that, the flexible disk controller transmits information about a result status of the track to the host system Subsequently, sequential format operations of remaining tracks are executed in the same manner, until format operations of all tracks are completed. This is how the format of a single flexible disk is completed.

As described above, a flexible disk format operation is executed prior to a write operation of data into a formatted flexible disk. After the completion of the format operation of the flexible disk, the flexible disk controller receives an instruction of write operations of data and then locates a sector, into which the data is written, in the flexible disk. The flexible disk controller finds the sector to store the data and then supplies the host system with a request for transmission of the data. The host system then transmits the data to the flexible disk controller upon the data transmission request. The flexible disk controller receives the data from the host system for a subsequent write operation of the data into the located sector, concretely in the data field of the located sector. The above mentioned write operation of data are executed in sequence for every sectors in the flexible disk.

The write operation of data into the data fields of the sectors in the flexible disk will be described with reference to FIG. 1.

The flexible disk controller receives a write operation instruction of data accompanied with parameters from the host system and then confirms a status of the flexible disk drive. The parameters accompanied to the write operation instruction specifies an identification field of a sector including a data field into which the data will be written. Namely, the flexible disk controller becomes a read enable state and then initiates a retrieval of a data field which is specified by the parameters until the corresponding identification field to the parameter is found. After the confirmation of the corresponding identification field, the flexible disk controller becomes a write operation state of data into a data field in the specified sector.

The write operation of data into a specified sector by the parameter is executed as follows. The flexible disk controller firstly generates sync data and then initiates a write operation of sync data into the data field of the specified sector. After that, the flexible disk controller generates the data address mark for a subsequent write operation thereof into the data field of the specified sector. The flexible disk controller then causes a request for a transfer of data to be stored into the specified data field and then transfers the request to the host system. The host system receives the request and then transfers the data to be stored into the specified data field to the flexible disk controller. The flexible disk controller receives a sequential transmission of the data from the host system and then executes a write operation of the data into the specified data field. After that, the flexible disk controller generates the cyclic redundancy check information for a subsequent write operation thereof into the specified data field. Finally, the flexible disk controller transmits information about a result status to the host system. That is how the write operation of the data into the specified data field of the sector is completed.

The above data write operation steps are continued for each sector in the flexible disk so that the write operation of data into the flexible disk is completed.

Although details of the above format operation and the subsequent data write operation are illustrated in FIGS. 3A to 4B, detailed descriptions thereof will be omitted because they can easily be understood from the drawings.

As described above, in the prior art, the format operation of and the subsequent data write operation into the flexible disk are executed. Such format operation and subsequent data write operation contain the following disadvantages.

One of the disadvantages is that the separate formatting and data writing operations require twice as much time than a combined formatting and data writing operation, because the data writing operation is executed after the flexible disk formatting operation. Namely, two times of the operations are sequentially executed according to two instructions, the first is the write operation of the identification information into the identification fields of the flexible disk, and the second is the write operation of data into the flexible disk. When the flexible disk drive has a rotation rate of 300 rpm, 80 cylinders, 5 msec of a shift time between tracks and a format operation of a single track requires 200 msec, format operations requires at least 64.8 sec., even without considering the time needed for interpreting instructions by the flexible disk controller.

Another disadvantage is the complexity of controlling the flexible disk controller by the host system due to both the instructions needed for the format operation and the data write operation. Since the transfer of several ten bytes from the host system to the flexible disk controller are required for only instruction and subsequent parameters from the host system, except for the identification informations and the data.

To eliminate these disadvantages, the claimed invention provide a novel method of controlling a flexible disk controller to execute a flexible disk format operation and a data write operation.

SUMMARY OF THE INVENTION

Accordingly, it is a primary object of the present invention to provide a novel method of controlling a flexible disk controller to execute a flexible disk format operation and a data write operation.

It is a further object of the present invention to provide a novel method of executing a flexible disk format operation and a data write operation in a short time.

It is a still further object of the present invention to provide a novel method of executing a flexible disk format operation and a data write operation by a simple control of a flexible disk controller.

The above and other objects, features and advantages of the present invention will be apparent from the following descriptions.

The present invention provides a novel method of controlling a flexible disk controller by a host system for executing a format operation and a concurrent write operation of data into a flexible disk in which the flexible disk has a plurality of tracks, each of which is divided into a plurality of sectors. The novel control method is executed by the following steps. First, the flexible disk controller specifies a track to be accessed in the plural tracks of the flexible disk, and then executes a preamble format operation of the specified track. Second, the flexible disk controller then executes sequential-specifying sectors to be accessed in the plural sectors of the specified track under parameters supplied from the host system. Third, the flexible disk controller then executes both a write operation of identification informations into an identification field of the specified sector and a concurrent write operation of data into a data field of the specified sector. Fourth, the above write operation step is repeated for every sectors of the specified track. Fifth, the flexible disk controller executes a postamble format operation of the specified track. Sixth, the above all steps are repeated for every tracks of the flexible disk, resulting in a completion of the format operation and the concurrent write operation of data into the flexible disk.

BRIEF DESCRIPTION OF THE DRAWINGS

Preferred embodiments of the present invention will hereinafter be described in detail with reference to the accompanying drawings.

PREFERRED EMBODIMENTS OF THE INVENTION

The present invention provides a novel method of concurrently executing a format operation and a data write operation into a flexible disk. In the present invention, a flexible disk controller concurrently executes a format operation to write identification information into the flexible disk and a data write operation. Therefore, a novel method of controlling the flexible disk controller is accomplished by a single instruction and a single operation. Namely, concurrently executing both a write operation to place identification information into an identification field of a sector and a data write operation to place data into a data field of the same sector. A novel method of controlling a flexible disk controller provided by the present invention is distinguishable from the conventional method in the ways the format operation and the subsequent data write operation are executed.

Figure 5:
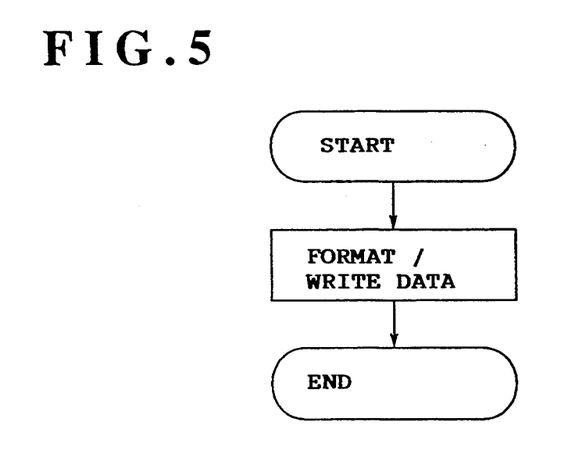
FIG. 5 is a simplified flow chart of a format operation and a data write operation in the preferred embodiment according to the present invention.
Figure 6A:
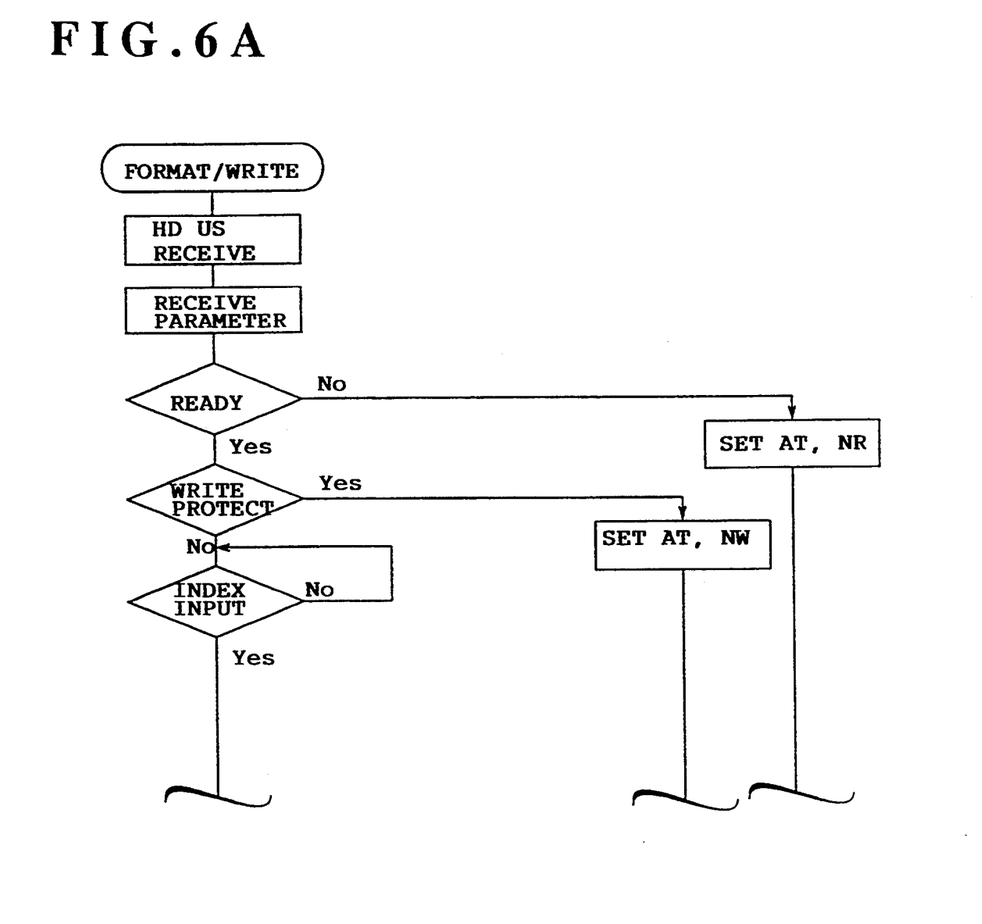
FIGS. 6A and 6B are detailed flow charts of a format operation and a data write operation in the preferred embodiment according to the present invention.
Figure 6B:
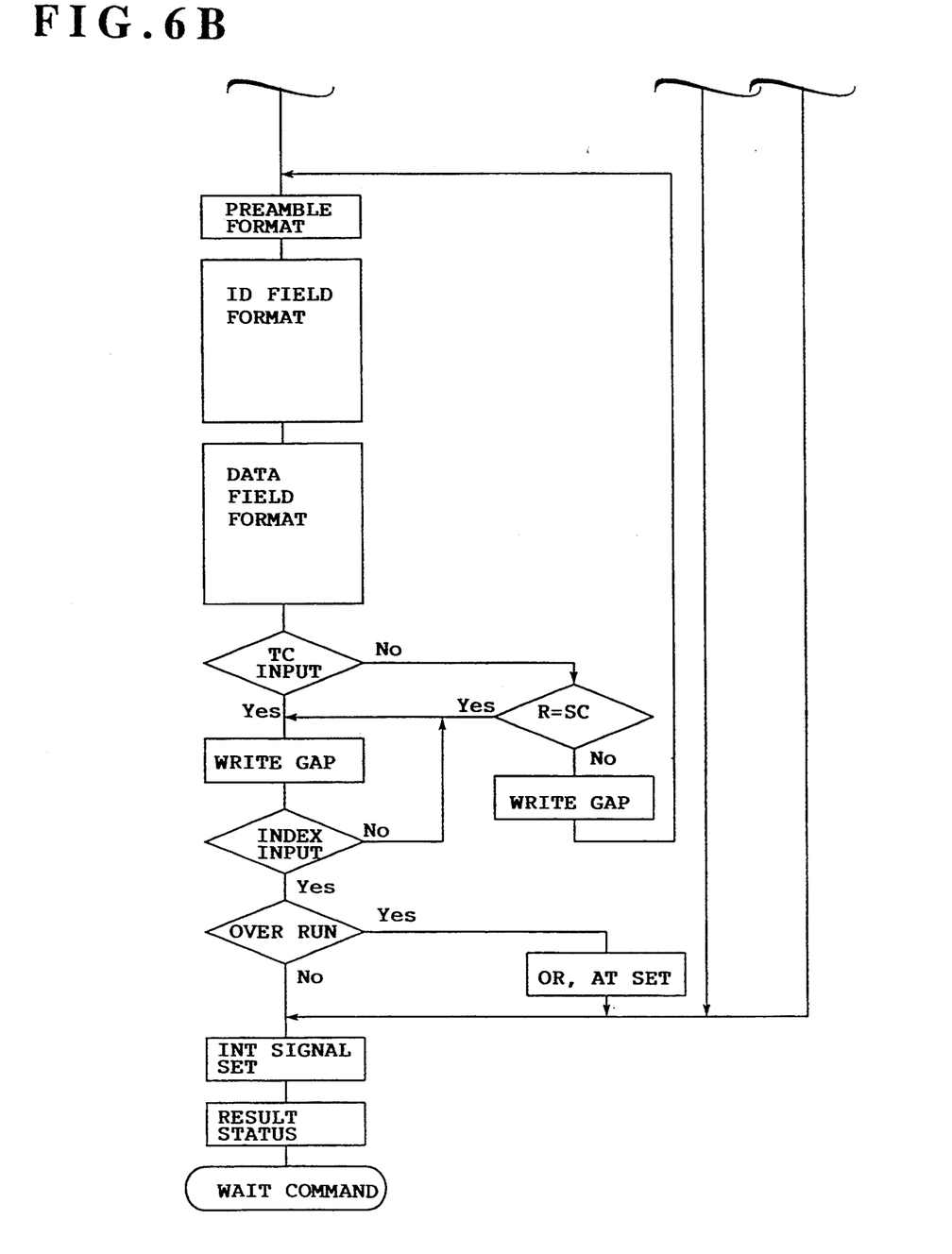

A preferred embodiment of a novel method of concurrently executing a format operation of and a concurrent write operation of data into the flexible disk by a flexible disk controller will be described with reference to FIGS. 5, 6A and 6B.

The write operation of the identification information for formatting a flexible disk and the concurrent write operation of data into the flexible disk are executed as follows. The flexible disk controller receives, from a host system, a format/write instruction to write both data and identification information into a flexible disk. The identification information include parameters which specify a sector to store both an identification at its identification field and a data bit at its data field. The flexible disk controller thus receives the parameters specifying a sector and then confirms that the flexible disk exhibits a rotation in the flexible disk drive unit. At which time, the flexible disk takes read and write enable states. After that, the flexible disk controller remains until it receives index pulse signals from the flexible disk drive unit. When the flexible disk controller receives the index pulse signal, it initiates a preamble format operation of a track. After the preamble format operation, the flexible disk controller executes sequential format operations of the plural sectors in the track according to the parameters, followed by a postamble format operation. Whereby, the format operation of the sector is terminated by the postamble format operation.

In a format operation of a particular sector in the track specified by the parameter, the flexible disk controller concurrently executes a format operation of the identification field (ID field) and a data write operation in a particular sector specified by the parameter.

The identification field format operation of a specified sector is executed as follows. The flexible disk controller firstly generates sync data and then initiates a write operation of sync data into the identification field of the specified sector. After that, the flexible disk controller generates an identification address mark for a subsequent write operation thereof into the identification field of the specified sector. The flexible disk controller then initiates a request for a transfer of an identification information and then transmits the request to a host system. The host system receives the request and then transfers the identification information to the flexible disk controller. The flexible disk controller receives the identification information from the host system and then executes a write operation of the identification information into the identification field. After that, the flexible disk controller generates the cyclic redundancy check information for a subsequent write operation thereof into the identification field. This is how the format operation of an identification field of a sector is completed.

Following to the above format operation of one sector, format operations of remaining sectors in the track are sequentially executed in the same manner, until format operations of all sectors in the single track are completed.

After the format operations of all sectors in the track, the flexible disk controller executes a format operation of a postamble as a final format operation of the track, resulting in a completion of the format operation of the track. After that, the flexible disk controller transmits information about a result status of the track to the host system.

Subsequently, sequential format operations of remaining tracks are similarly executed, until format operations of all tracks are completed. This is how the format of the single flexible disk is completed.

The write operation of data into data fields of specified sectors is executed concurrently with the write operation of the identification information into the identification field of the specified sector.

The flexible disk controller has received the write operation instruction of data concurrent with the write operation instruction of the identification information from the host system. The flexible disk controller firstly generates sync data and then initiates a write operation of sync data into a data field of a specified sector. Thereafter, a flexible disk controller generates a data address mark for a subsequent write operation thereof into the data field of the specified sector. The above steps in the data write operation may be concurrently executed with the steps of the identification information write operation.

Following a request for a transfer of an identification information, the flexible disk controller initiates a request for a transfer of data to be stored into a specified data field and then transfers the request to a host system. The host system receives the request and then transfers the data to be stored into the specified data field to the flexible disk controller. Following the receipt of the identification information, the flexible disk controller receives a sequential transmission of the data from the host system and then executes a write operation of the data into the specified data field. Thereafter, the flexible disk controller generates cyclic redundancy check information for a write operation thereof into the specified data field.

The above mentioned identification information write operation and the concurrent data write operation steps are continued for every sectors in the flexible disk until the above both operations for either all sectors or predetermined sectors of the single track in the flexible disk are completed. After both write operations of identification information and the data into the sectors are completed, the flexible disk controller initiates a postamble format operation. After the postamble format operation, the flexible disk controller executes a write operation of the gap data and then continues it until an index pulse is inputted. This results in having the format operation and the data write operation of the track to be concurrently completed. The flexible disk controller then initiates a request for a receipt of a result status and then transmits the request to the host system for a subsequent transmission of the result status to the host system.

The above format operation and the data write operation are repeated for every tracks in the flexible disk controller. This is how the write operation of the identification information and the concurrent write operation of the data into the flexible disk are executed.

As described above, the format operation and the concurrent data write operation of a flexible disk are now fully executed. The novel format and concurrent data write operations has the following advantages.

One of the advantages is that this novel method of controlling the flexible disk controller provides a considerable reduction of time for both the format operation and the data write operation because both operations are executed concurrently. Namely, only a single instruction and a single operation are required. When the flexible disk drive unit has a rotation rate of 300 rpm, 80 cylinders, 5 msec of shift time between tracks, and a format operation of a single track requires 200 msec, the operation time is reduced down to 32.4 sec., without even considering times required for interpreting instructions by the flexible disk controller. As compared to the prior art operation time of 64.8 sec., the operation time is reduced to half.

Another advantage is that considerable simplification of control operations of the flexible disk controller by the host system is achieved, due to the single instruction and the single operation. Namely, both write operations of the identification information and the data into the flexible disk are concurrently executed.

Modifications of the present invention may be apparent to a person of ordinary skill in the art. The embodiments shown and described by way of illustrations are by no means intended to be considered in a restrictive sense. Accordingly, the claims are intended to cover all modifications which fall within the sprit and scope of the invention.

What is claimed is:

1. A method of executing a format operation and a write operation on a flexible disk having a plurality of tracks, each of said tracks being divided into a plurality of sectors, said method comprising the steps of:
    first, specifying a track to be accessed among said plurality of tracks of said flexible disk;
    second, executing a preamble format operation of said specified track;
    third, sequentially-specifying each sector to be accessed among said plurality of sectors of said specified track;
    fourth, concurrently-executing both a write operation of identification information into an identification field of a specified sector and a write operation of data into a data field of said specified sector;
    fifth, repeating said fourth concurrently-executing step for every remaining sectors of said specified track;
    sixth, executing a postamble format operation of said specified track; and
    seventh, repeating steps first to sixth for every remaining tracks of said flexible disk.

2. The method as claimed in claim 1, further comprising the steps of:
    executing a write operation of gap data into said specified track until an index pulse signal is inputted, after said sixth postamble format step; and
    transmitting a result status from a flexible disk controller to a host system.

3. The method as claimed in claim 1, further comprising the steps of:
    initiating an instruction of format and data write operations; and
    confirming a read and write enable state of said flexible disk before said second preamble format operation step.

4. The method as claimed in claim 1, wherein said fourth concurrent-executing step comprises the steps of:
    executing a write operation of sync data into both said identification field and said data field of said sector;
    executing a write operation of address marks into both said identification field and said data field of said sector;
    executing a write operation of said identification information into said identification field;
    executing a write operation of said data into said data field of said sector; and
    executing a write operation of cyclic redundancy check information into both said identification field and said data field of said sector.

5. The method as claimed in claim 1, wherein said fourth concurrent-executing step comprises the steps of:
    executing a write operation of sync data into said identification field and a subsequent write operation of sync data into said data field of said sector;
    executing a write operation of an address mark into said identification field and a subsequent write operation of an address mark into said data field of said sector;
    executing a write operation of said identification information into said identification field;
    executing a write operation of said data into said data field of said sector; and
    executing a write operation of cyclic redundancy check informations into said identification field and said data field of said sector.

6. The method as claimed in claim 1, wherein said fourth concurrent-executing step comprises the steps of:
    executing a write operation of sync data and a subsequent write operation of an address mark into said identification field of said sector;
    executing a write operation of sync data and a subsequent write operation of an address mark into said data field of said sector;
    executing a write operation of said identification information into said identification field;
    executing a write operation of said data into said data field of said sector; and
    executing a write operation of cyclic redundancy check informations into said identification field and said data field of said sector.

7. A method of using a host system to control a flexible disk controller for executing a format operation and a write operation on a flexible disk having a plurality of tracks, each of said tracks being divided into a plurality of sectors, said method comprising the steps of:
    first, using said flexible disk controller to specify a track to be accessed among said plurality of tracks of said flexible disk;
    second, using said flexible disk controller to execute a preamble format operation of said specified track;
    third, using said flexible disk controller to sequentially specify each sector to be accessed among said plurality of sectors of said specified track in compliance with parameters supplied from said host system;

fourth, using said flexible disk controller to concurrently execute both a write operation of identification information into an identification field of a specified sector and a write operation of data into a data field of said specified sector;

fifth, using said flexible disk controller to repeat said fourth concurrently-executing step for every remaining sectors of said specified track;

sixth, using said flexible disk controller to execute a postamble format operation of said specified track; and seventh, using said flexible disk controller to repeat steps first to sixth for every remaining tracks of said flexible disk.

8. The method as claimed 7, further comprising the steps of:

using said flexible disk controller to execute a write operation of gap data into said specified track until an index pulse signal is inputted, after said sixth postamble format operation; and transmitting a result status from said flexible disk controller to said host system.

9. The method as claimed in claim 7, further comprising the steps of:

using said flexible disk controller receive an instruction of format and data write operations from said host system; and using said flexible disk controller confirm a read and write enable state of said flexible disk before said second preamble format operation step.

10. The method as claimed in claim 7, wherein said fourth concurrently-executing step comprises the steps of:

using said flexible disk controller to execute a write operation of sync data into both said identification field and said data field of said sector;

using said flexible disk controller to execute a write operation of address marks into both said identification field and said data field of said sector;

transmitting identification information from said host system to said flexible disk controller;

transmitting data from said host system to said flexible disk controller;

using said flexible disk controller to execute a write operation of said identification information into said identification field;

using said flexible disk controller to execute a write operation of said data into said data field of said sector; and using said flexible disk controller to execute a write operation of cyclic redundancy check information into both said identification field and said data field of said sector.

11. The method as claimed in claim 7, wherein said fourth concurrently-executing step comprises the steps of:

using said flexible disk controller to execute a write operation of sync data into said identification field and a subsequent write operation of sync data into said data field of said sector;

using said flexible disk controller to execute a write operation of an address mark into said identification field and a subsequent write operation of an address mark into said data field of said sector;

transmitting identification information from said host system to said flexible disk controller;

transmitting data from said host system to said flexible disk controller;

using said flexible disk controller to execute a write operation of said identification information into said identification field;

using said flexible disk controller to execute a write operation of said data into said data field of said sector; and using said flexible disk controller to execute a write operation of cyclic redundancy check information into said identification field and a subsequent write operation of cyclic redundancy check information into said data field of said sector.

12. The method as claimed in claim 7, wherein said fourth concurrently-executing step comprises the steps of:

using said flexible disk controller to execute a write operation of sync data and a subsequent write operation of an address mark into said identification field of said sector;

using said flexible disk controller to execute a write operation of sync data and a subsequent write operation of an address mark into said data field of said sector;

transmitting identification information from said host system to said flexible disk controller;

transmitting data from said host system to said flexible disk controller;

using said flexible disk controller to execute a write operation of said identification information into said identification field;

using said flexible disk controller to execute a write operation of said data into said data field of said sector; and using said flexible disk controller to execute a write operation of cyclic redundancy check information into said identification field and said data field of said sector.

* * * * *